United States Patent
Snaper

(10) Patent No.: US 7,854,823 B2
(45) Date of Patent: Dec. 21, 2010

(54) SYNTHESIS OF DIAMOND BY EXTRACTION OF A PULSE DERIVED FROM THE ABRUPT COLLAPSE OF A MAGNETIC FIELD

(76) Inventor: Alvin A. Snaper, 2800 Cameo Cir., Las Vegas, NV (US) 89107

( * ) Notice: Subject to any disclaimer, the term of this patent is extended or adjusted under 35 U.S.C. 154(b) by 1064 days.

(21) Appl. No.: 12/228,506

(22) Filed: Jun. 20, 2006

(65) Prior Publication Data
US 2009/0014314 A1      Jan. 15, 2009

(51) Int. Cl.
*C25B 5/00* (2006.01)
(52) U.S. Cl. .................. 204/155; 425/77; 423/446
(58) Field of Classification Search .................. 204/155
See application file for complete search history.

(56) References Cited
U.S. PATENT DOCUMENTS

| | | | | |
|---|---|---|---|---|
| 3,399,254 A | * | 8/1968 | Dunnington | 264/84 |
| 3,574,580 A | * | 4/1971 | Stromberg et al. | 51/307 |
| 3,652,220 A | * | 3/1972 | Lindstrom | 423/446 |
| 4,466,938 A | * | 8/1984 | Gigl et al. | 264/332 |
| 5,122,043 A | * | 6/1992 | Matthews | 425/77 |
| 5,442,846 A | * | 8/1995 | Snaper | 29/419.2 |
| 5,609,683 A | * | 3/1997 | Pike-Biegunski | 117/200 |
| 6,838,786 B1 | * | 1/2005 | Frescaline et al. | 307/106 |

OTHER PUBLICATIONS

English Abstract of Bushman et al., "Possibility of Electric-Explosion Diamond Synthesis" Akademiia Nauk SSSR 315(5) pp. 1124-1126 (1990).*

* cited by examiner

*Primary Examiner*—Harry D Wilkins, III
*Assistant Examiner*—Bryan D. Ripa
(74) *Attorney, Agent, or Firm*—James M. Duncan, Esq.; Klein, DeNatale, Goldner, etc.

(57) ABSTRACT

A process for converting carbonaceous material into diamond utilizing the compressive force derived from an abruptly collapsing magnetic field.

10 Claims, 1 Drawing Sheet

SYNTHESIS OF DIAMOND BY EXTRACTION OF A PULSE DERIVED FROM THE ABRUPT COLLAPSE OF A MAGNETIC FIELD

FIELD OF THE INVENTION

Synthesis of diamond from carbon in a different state, or in mixtures of different states, utilizing the exertion of a pulse derived from the collapse of a strong magnetic field.

FIELD OF THE INVENTION

The synthesis of diamond is known and in commercial use. In the course of only a few decades physicists and chemists have devised processes that produce carbon in its crystalline diamond state with the use of equipment that creates what are believed to be the temperature, pressure, and process criteria for converting carbon into diamond from some other state.

In nature, the formation of diamond occurs in volcanic formations as occasional inclusions in extensive structures from which they are mined ultimately by hand. The apparent condition required for this creation of diamond was the existence at the right moment of carbon at appropriate and appropriately high temperature and pressure.

Commercial efforts to produce diamonds (which need not be of gem quality to be of value) sensibly were directed to determination and replication of appropriate processing parameters and starting materials. It came as a mild surprise that it was possible at all.

These prior art processes are poorly suited for economical large scale production. The equipment is large, expensive, requires heavy maintenance, and is costly to operate. Accordingly efforts have been made, and with this instant invention continue to be made, to provide a more convenient and economical system to produce diamond.

For example, U.S. Pat. No. 5,122,043 to Matthews discloses a vacuum press for fast pressure pulsing of electrically conductive materials at a high pressure at a high temperature. This patent provides an excellent description of its own and of various other apparatus and processes to produce diamond.

In general these processes heat the material to high temperatures and at the same time exert a strong compressive force. In general they can be characterized as presses with heating means. In the Matthews patent, the effort is made to provide a high pressure press together with a quickly-functioning means to heat the sample. For heating purposes it utilizes the discharge from a capacitor bank of considerable size.

In addition, Matthews suggests putting much of the system in a vacuum. What results is a well-engineered system for its intended purpose, but which solves the problem of providing necessary conditions for change of state with a large array of expensive devices, all with their own problems.

For example, Matthews' process includes a pair of platen plates to exert physical pressure. Such a press includes its own structure used along with a sub-structure in which the charge is heated. Such a structure is referred to as resembling a Bridgman anvil. It is large, and complicated, and generally run under high vacuum conditions, The objective of the forgoing and of all or of most other systems is to provide for the duration of whatever length of time is appropriate, the necessary temperature and pressure. Because the necessary temperature is very high, the effort is made to exert it for a minimum period of time, hopefully to protect the equipment itself from the consequences of longer exposure to such a high temperature and the high expense of doing so.

The adverse consequences of the prior art efforts are straightforward and have been recognized by competent engineers and scientists. Still, the existing equipment is complicated, costly, and cumbersome. It is an object of this invention to attain the advantages sought in the prior art with literally almost none of the equipment and complications involved in the prior art. Instead of presses and the like, the apparatus is reduced to little more than a sacrificial air-tight electrically conductive container to hold the charge to be converted, and with no more than a source of a substantial magnetic field, and a readily achieved vacuum readily established on a one-time basis, in a relatively small volume of about the same volume as the charge itself. The macroscopic temperature of the charge scarcely rises as the result of the process, while the temperature and pressure conditions on the microscopic (or sub-microscopic) level may be extremely high, but without exposing associated equipment or personnel to seriously elevated temperatures. The very high pressure and temperature required is exerted for the briefest of moments, and create no need for substantial containment or pressure-exerting means.

More recently, vacuum deposition techniques have been proposed, but these differ remarkably from this invention both in the nature of the diamond produced, and in the cost and type of process equipment involved.

BRIEF DESCRIPTION OF THE INVENTION

This invention utilizes the magnetic pinch effect known as "magnetic pulse forming" discussed in detail in Snaper U.S. Pat. No. 5,442,846, which is incorporated herein by reference.

Whenever a rapidly changing magnetic flux cuts across a conductive material, a current is developed proportional to the initial intensity and time rate of change of the magnetic flux. The higher the rate of change, the greater the induced current.

Then, whenever there is an induced current, there is an associated magnetic field of such polarity as to oppose the magnetic field producing the current. This reactive force between the rapidly changing magnet and a metallic material within its field can produce very significant forces of repulsion. The effect sometimes is called "Lenz's Law Repulsion".

In magnetic pulse forming, a rapidly changing, unidirectional current is applied to a work coil from an energy storage capacitor. The required high rate of change of flux is produced by rapidly discharging a large electric charge from an energy storage capacitor through a very low resistance coil of a relatively few turns. The initial discharge current can be extremely heavy and will rapidly decrease in the early part of its exponential decay curve. This heavy current, rapidly decaying, causes a rapidly decaying flux that induces a heavy, similarly decaying current within the metal of the work piece.

Because the flux is concentrated within the core of the work coil, the reaction flux from the induced current is directed radially outward against the flux of the work coil. This causes extreme forces of repulsion to "pinch" the work piece radially inward.

In the process of this invention, the magnetic pulse forming process is exerted on a charge contained in an electrically conductive container. The container is caused to shrink against the charge, thereby exerting a profoundly strong compressive force on the charge such that, portions of the charge will be converted into the diamond state.

The elapsed time for the process is extremely brief, and the very strong magnetic pulse entirely dissipates in that short time. There does result a temperature increase, but it will scarcely be detected by measurement of the charge. The temperature is developed sub-microscopically only briefly, at the same instant as the pressure pulse exists. The concurrence of these, however brief, has been proved to produce diamond from graphite, as evidenced by an assay made by the Gemealogical Institute of America.

In this invention a charge of material to be converted to diamond is placed in a sealed conductive metal container. This container is placed inside an electrically conductive coil. An abrupt discharge of a substantial electrical current is passed as a pulse through the coil. There will result a radially-inwardly directed, physical force that constricts the container wall. This exerts a compressive force on the charge which, if properly exerted will convert at least some of the charge to diamond.

Accordingly to a preferred but optional feature of the invention the container is a tubular structure formed of a deformable conductive metal, that can be evacuated and sealed with the charge inside it, preferably compacted and in contact with the inside wall of the container. The coil is formed as a winding of a plurality of turns around the container.

According to a preferred but optional feature of the invention, the coil is connected to a source of electrical energy to be delivered as a unidirectional pulse with an abrupt inception and an abrupt termination, thereby providing a strong magnetic field which abruptly collapses. The preferred source of the electrical current is a bank of capacitors suitably charged and abruptly released.

Accordingly to another preferred but optional feature of the invention, the container can be loaded with the charge in a vacuum chamber, and sealed while under vacuum.

According to yet another preferred but optional feature of the invention, the charge may include elements intended as trace elements for purposes such as colorizing the resulting diamond, or as diamond treatments to act as seeds.

The above and other features of this invention will be fully understood from the following detailed description and the accompanying drawings, in which:

DETAILED DESCRIPTION OF THE INVENTION

Figure 1:
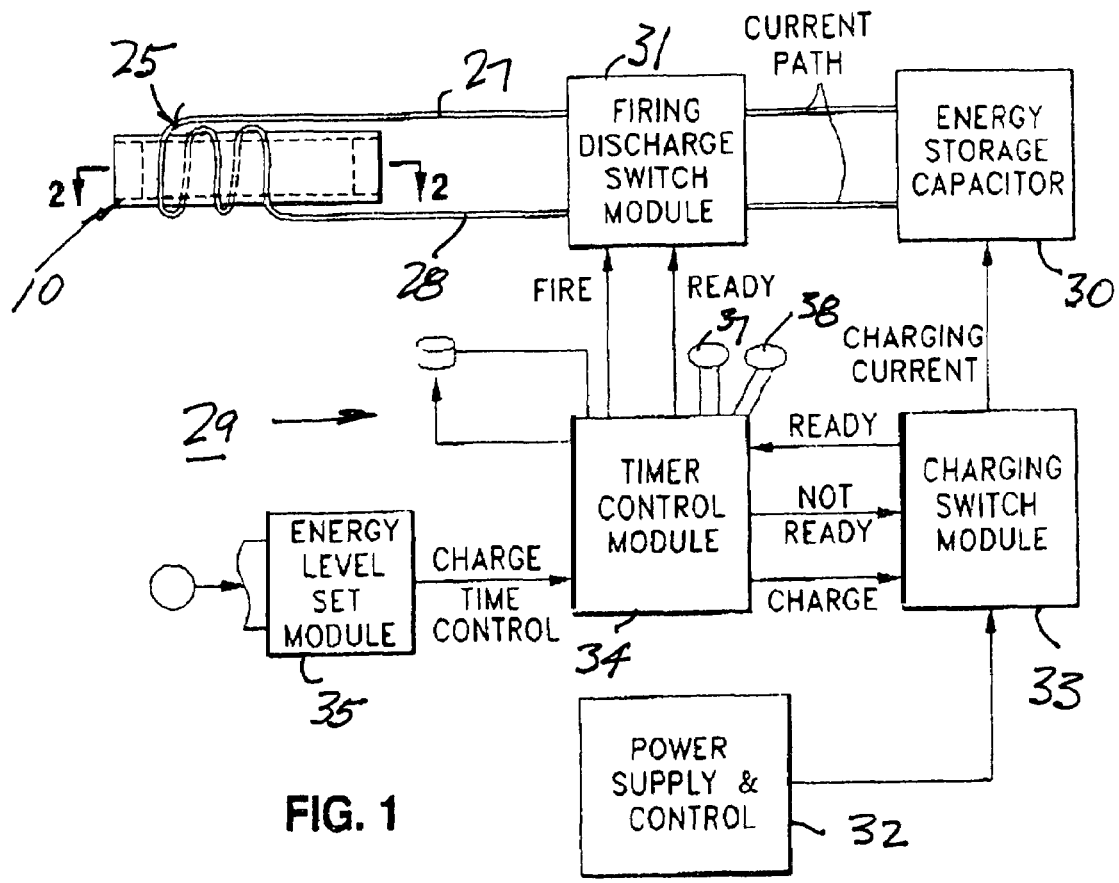
FIG. 1 is a side view partly in schematic notation showing the preferred embodiment of the invention.
Figure 2:
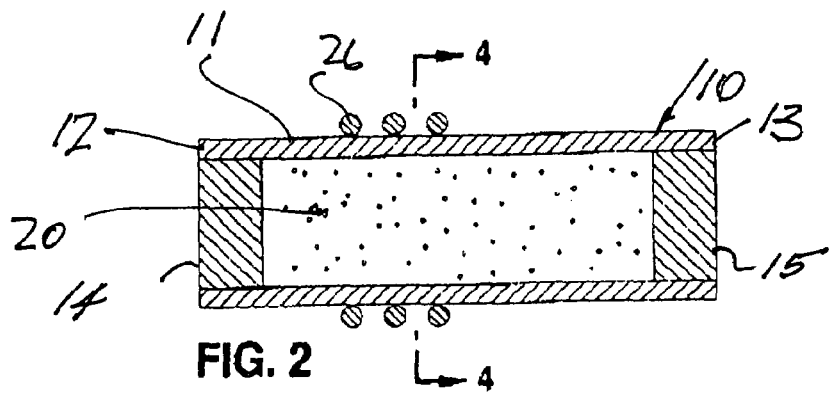
FIG. 2 is an axial cross section taken at line 2-2 in FIG. 1.
Figure 4:
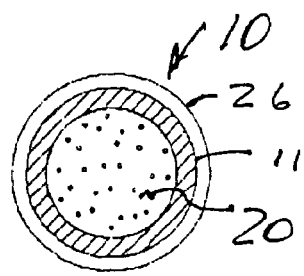
FIG. 4 is a lateral cross-section taken at line 4-4 in FIG. 2.

A container 10 comprises a tubular structure with a peripheral wall 11 having a dimension of wall thickness and a pair of ends 12, 13. Each end is ultimately closed and sealed by a respective plug 14, 15.

While other closures are useful, and if desired one closed end may be integral with the wall, it will usually be found to be convenient to provide peripheral grooves (not shown) in the plugs, and swage the wall into the grooves to complete a hermetic and reliable closure. Other types of closures, such as threads are also suitable.

To load the container, it is convenient to insert one of the plugs at the start. Then the container and the other plug may be placed in a vacuum chamber (not shown), along with material that is to constitute the charge. The chamber may be pumped down. Then, for example by manipulations exerted through gloves, the charge 20 can be packed into the container. It is best practice to compact this as tightly as possible and to fill the container completely.

Thereafter, while still under vacuum, the other plug will be fitted and fixed in place, preferably by swaging. The container and charge are now ready for the process.

Motive power for this invention is imposed through a multi-coil winding 25 which includes a plurality of coils 26 in series connection, with leads 27, 28 leading to and connected with a source 29 of electrical current. The container is placed inside 6 the winding for processing.

FIG. 1 is a functional block diagram showing the modules in the system to supply the necessary pulse of current to the work coil. The coil is not connected to the energy storage capacitor 30 until the firing switch 31 closes. Switch 31 must remain open until the desired energy level of the capacitor has been achieved by charging from the power supply 32 through the charging switch 33. This charging switch must remain closed until the capacitor has been charged for a preset time as limited by the timer control module 34 set by the energy set level module 35. The charging switch 33 must open when the preset time has expired, and this event delivers a "ready" signal to the timer control module.

The charging action is indicated by a charging indicator light 36 which goes out when the charging switch opens. The readiness condition is indicated by the ready light 37 which remains on until the manual firing switch 31 is closed. When the firing switch is closed, it signals to the timer control unit 34 to close the firing discharge switch 38 if, and only if, the charging path switch module 33 is in an open condition. This last action permits the energy storage capacitor to suddenly discharge through the firing discharge switch module and the work coil.

The preferred embodiment of the firing discharge switch (not shown) is a closed tube containing a few drops of mercury metal and having heavy contacts at one end. The tube is rotated by a solenoid to produce closure as the mercury metal falls to the contact end of the tube and flows against the contents. This keeps the heavy arc of contact closure confined in order to reduce any flame hazard. The charging switch, on the other hand can be a battery of silicon controlled rectifiers, since its current is smaller and is applied over a longer time. The reverse resistance of such rectifiers must be adequate to resist any significant leakage of the capacitor back through the charging power supply circuits. These rectifiers are placed in an "off" condition in order to prevent the closing of the discharge path from overloading the power supply. The energy to perform all of these operations may be provided by an engine driven generator or alternator (not shown).

Figure 3:
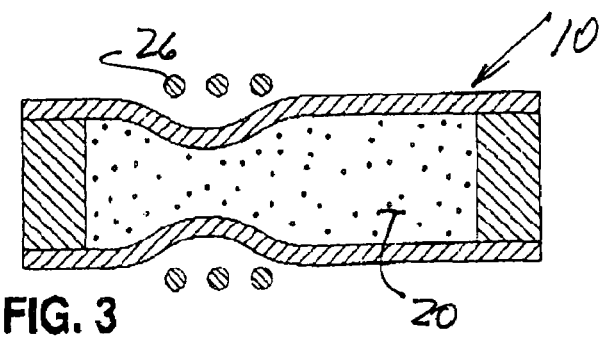
FIG. 3 is an axial cross-section of the container after the process.

When energized, a magnetic field will be developed around the container. When the current is abruptly terminated, the field will abruptly collapse. These results a very powerful constricting force which presses the container radially inwardly as shown in FIG. 3. This exerts a tremendous physical force on the charge, especially within the region pressed most axially aligned with the container wall.

This constriction occurs within a very brief portion of a second, and exerts a force whose magnitude can only be estimated by the results attained. At the instant of greatest compaction, the temperature will have risen locally to a very high value, again one which can only be theorized from the results attained.

Because the event is so brief, the very high instantaneous temperature does not result in a macroscopic increase in temperature of the charge. It clearly occurred, and along with the elevated pressure that occurred simultaneously, there will have been a change in state to diamond in some regions of the charge. It is not to be anticipated that the entire charge will be converted to a single big diamond. The contents will be examined for the product by cutting the container open and screening the diamond from the residue. The container is thereby a sacrificial element in the process.

The size and number of turns of the coils, and the magnitude and voltage of the electrical charge depend entirely on the size of the charge and of its composition. The diameter of the container can be as small as desired. The outer limit of size is mainly determined by the size of the charge, which in turn at least partly decides the size of diamonds to be developed.

In development tests, an aluminum alloy tube about 1 inch outer diameter with a wall thickness of about 0.030 inches was successfully used. Different materials can be used for the tube, providing they are sufficiently flexible so as not to fracture.

The charge depends on the objectives. For diamond producers it must be carbonaceous. A suitable starting martial is a granular graphite packed tightly into the tube. It may or may not include other materials, such as diamond for seed purposes or metals for trace coloration.

The charge should be conductive, as graphite is. It may be mixed with some non-conductive material, but this would ordinarily not be done.

The parameters of the apparatus depend on the power needed, which is also a function of the size of the charge. Once an electrical system is designed, minor experimentation with charge and container size will soon decide the container dimensions.

The essence of this invention is the utilization of the magnetic pulse to create, very locally, conditions to form diamonds. The simplicity and economy of the process are evident.

This invention is not to be limited by the embodiment shown in the drawings and described in the description, which is given by way of example and not of limitation, but only in accordance with the scope of the appended claims.

I claim:

1. The process of forming diamond from carbonaceous material, comprising:
   a. filling into a closed electrically conductive container a charge comprising 100 percent granular graphite, the material of the container being flexible without fragmentation;
   b. placing said filled container inside a multi-coil electrical winding;
   c. exerting and abruptly terminating an electrical current through said winding to exert a magnetic pulse in said container and charge of such magnitude and duration as to create in said charge the conditions for conversion of state to diamond of at least some of said charge without a mascroscopic increase in the temperature of the charge; and
   d. opening said container to remove the contents thereof, and separating diamond therefrom.

2. A process according to claim 1 in which the container is tubular with a peripheral electrically conductive metal wall, and a central axis, in which the container is placed inside said winding, coaxially with the axis of the winding.

3. A process according to claim 1 in which the power is supplied from a bank of capacitors controlled by a firing switch which abruptly discharges said bank.

4. A process according to claim 2 in which said container is subjected to said magnetic pulse a plurality of times, each at a different location along said container.

5. A process according to claim 1 in which said container is loaded and sealed while in a vacuum.

6. A process according to claim 1 in which the material of the container is aluminum or an alloy of aluminum.

7. A process according to claim 1 in which the electrical current is supplied from a bank of capacitors controlled by a firing switch which abruptly discharges said bank.

8. A process according to claim 7 in which said container is subjected to said magnetic pulse a plurality of times, each at a different location along said container.

9. A process according to claim 8 in which said container is loaded and closed while in a vacuum.

10. A process according to claim 9 in which the material of the container is aluminum or an alloy of aluminum.

* * * * *